United States Patent

[11] 3,593,687

[72] Inventor Douglas Clegg
 Calistoga, Calif.
[21] Appl. No. 797,857
[22] Filed Feb. 10, 1969
[45] Patented July 20, 1971
[73] Assignee Holm Tractor & Equipment Company
 Petaluma, Calif.

[54] MILKING MACHINE SUPPORT STRUCTURE
 6 Claims, 6 Drawing Figs.

[52] U.S. Cl. .................................................. 119/14.1
[51] Int. Cl. ................................................... A01j 07/00
[50] Field of Search ........................................ 119/14.1-
 —14.13, 14.54, 14.45

[56] References Cited
 UNITED STATES PATENTS
2,136,228  11/1938  Babson et al. ............... 119/14.13
2,775,224  12/1956  Rawson et al. ............... 119/14.13
2,783,737  3/1957   Thomas ...................... 119/14.54
3,033,161  5/1962   Babson ....................... 119/14.13

Primary Examiner—Hugh R. Chamblee
Attorney—Limbach, Limbach & Sutton

ABSTRACT: A retraction device for automatic withdrawal of a milking claw from milking position in an automated system for the milking of cows. The device includes a support arm for a milking claw, a first adjustable connecting linkage for suspending the arm from the wall of a stall and swinging the arm from a milking position underneath the cow to a laterally withdrawn position outside of the stall. Second adjustable connecting means permit the arm to be moved vertically in the milking position, and a single control is provided to move the arm upwardly as it swings out of the stall. The suspension arm preferably provides for pivotal movement about three parallel vertical axes in the milking position so that the milking claw may move freely with the cow while it is vertically supported by the arm.

INVENTOR.
DOUGLAS CLEGG
BY Limbach & Limbach
ATTORNEYS

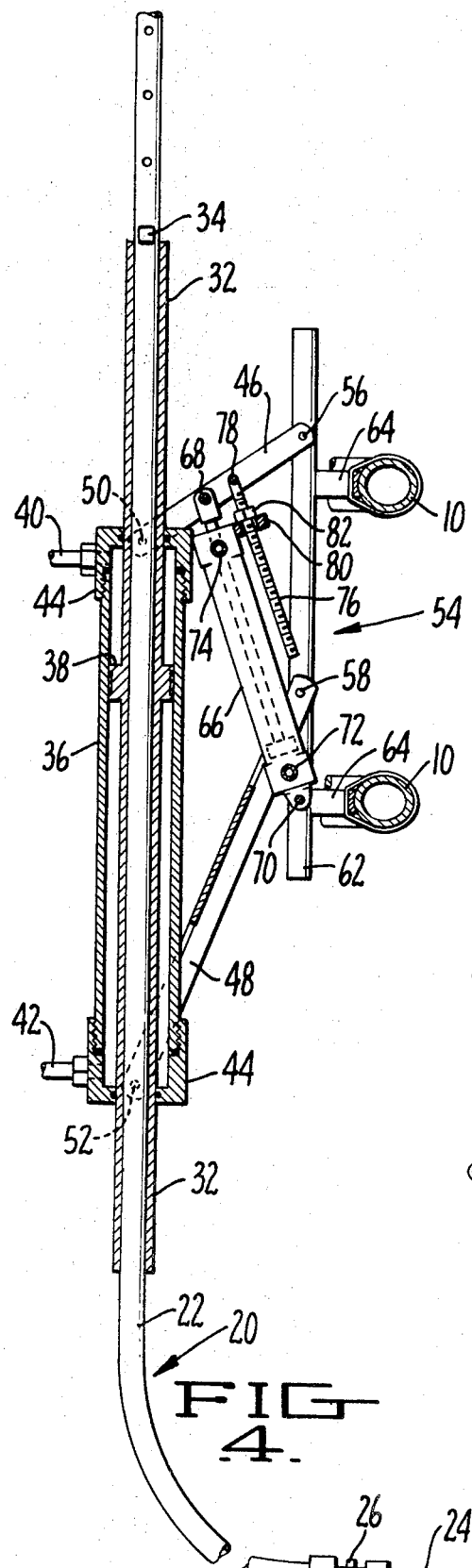
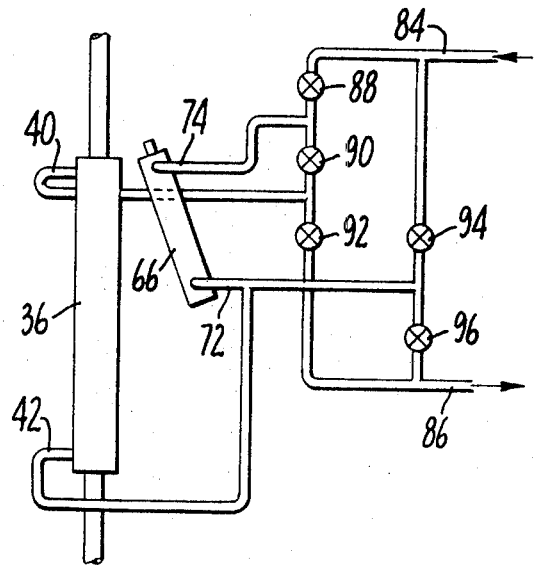
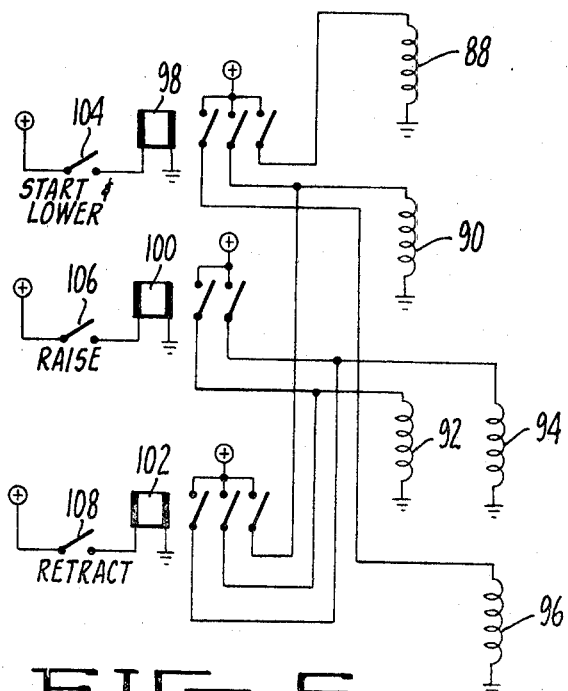
FIG. 4.
FIG. 5.
FIG. 6.
INVENTOR
DOUGLAS CLEGG
BY Limbach & Limbach
ATTORNEYS

MILKING MACHINE SUPPORT STRUCTURE

SUMMARY OF INVENTION

Automated milking barns are known in the dairy art and one such barn is described in U.S. Pat. No. 3,246,631 issued to William Z. Holm. As explained in the Holm patent, it is desirable in such an automated barn to provide automatic means for removing the milking claw from a cow when it is determined by some milk measuring means that the cow has ceased to give milk. A variety of milk measuring means may be employed for measuring the flow of milk given by the cow such as devices for detecting the milk from its volume, weight, temperature, electrical conductivity, density, light transmission, pH, or viscosity. The automatic retraction means shown in the Holm patent for retracting the claw in response to the measuring means is a device mounted in the floor of the barn so that it is relatively difficult to install such devices in milking barns after the barn has been built.

It is a principal object of this invention to provide an improved mechanism for supporting a milking claw during milking and which may operate in response to the milk-measuring means mentioned above to automatically withdraw the milking claw from the cow after the cow ceases giving milk as disclosed in the Holm patent.

It is a particular object of this invention to provide such a claw support and withdrawal mechanism which may be mounted very simply in a milking barn by attachment to any structural member above the floor such as the structural members which form the sidewall of a milking stall.

It is another object of the invention to provide such a mechanism for supporting the claw beneath a cow during milking and totally withdrawing the claw from the milking stall after milking so that the claw will be protected from damage when cows move into and out of the milking stall.

It is another object of the invention to provide such an apparatus in which the position of the milking claw during milking can be adjusted vertically with respect to the floor of the milking stall so that the position of the milking claw can be adjusted for cows of different size.

It is a specific object of the invention to provide such an apparatus having a single electrical switch control to initiate both raising and withdrawing the claw so that the apparatus can be operated effectively in accordance with the Holm patent by operating the single switch in response to the measuring means of the Holm patent.

Other objects and advantages of the invention will become apparent from the following description read in conjunction with the attached drawing in which:

FIG. 4 is a vertical sectional view on larger scale showing the interior parts of the apparatus of FIGS. 1 and 2;

FIG. 5 is a hydraulic diagram showing hydraulic controls for operating the apparatus of FIGS. 1—4, and;

FIG. 6 is a wiring diagram showing the electrical controls for the valves in the hydraulic circuit of FIG. 5.

DETAILED DESCRIPTION

Figures 1, 2, 3:
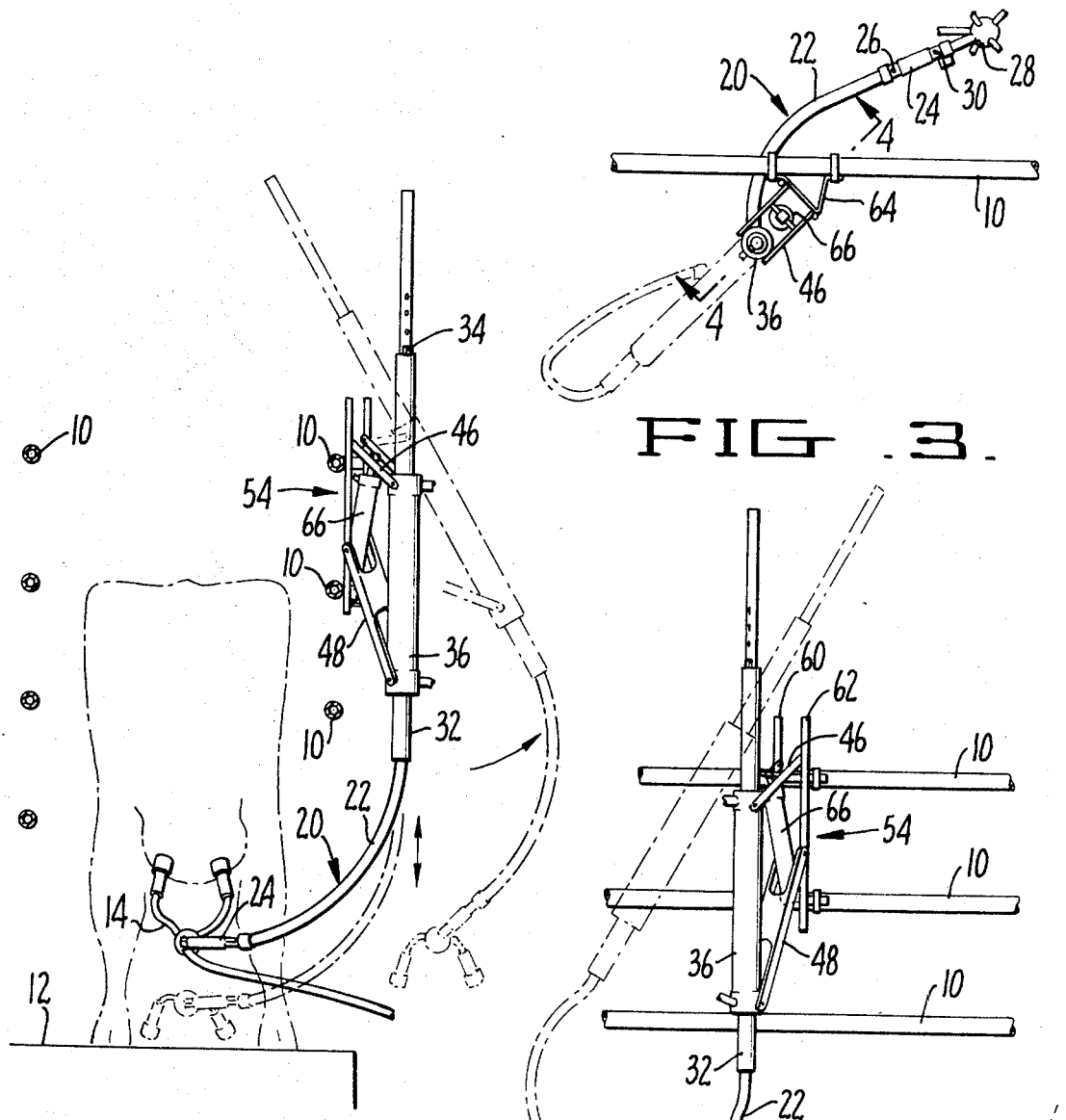
FIG. 1 is a vertical sectional view through a milking stall showing one embodiment of the apparatus of this invention suspended from a sidewall of the stall.
FIG. 2 is a side elevational view of the apparatus of FIG. 1.
FIG. 3 is a top plan view of the apparatus of FIG. 1 with all of the views in FIGS. 1, 2 and 3 showing the apparatus in milking position in solid line and showing the apparatus in withdrawn position in phantom outline.

Referring now in detail to the drawings, the apparatus illustrated therein is one embodiment of this invention which is adapted to be suspended from pipe rails 10 which form the sidewalls of a milking stall which has a floor 12 providing a milking area for a cow as illustrated in FIGS. 1 and 2. A milking claw 14 is positioned adjacent to the milking stall and provided with a milk conduit 16 by which milk may be conveyed away. The milking claw itself may be provided with a milk measuring means as described above, but preferably the conduit 16 is connected to measuring means 18 by which the flow of milk from the cow is determined by measuring the volume of the milk flowing through line 16.

The claw 14 is supported on the end of an arm 20 which has an upper rigid section 22 and a pivoted link 24. The link 24 is pivotally connected to the arm section 22 by a pivot pin 26 (FIG. 4), and a claw support bracket 28 is pivotally connected to the link 24 by a pivot pin 30 where the pivot pins 26 and 30 are substantially parallel to the upper straight section of the rigid portion 22 of the arm 20. The claw support bracket 28 preferably includes a high friction adjustment by which the claw may be rotated about a horizontal axis, but the claw may be rigidly attached to the bracket 28.

As best seen in FIG. 4, the upper rigid section 22 of the arm 20 extends telescopically through a sleeve 32 with a pin 34 extending through the top of the arm 20 supporting the weight of the arm 20 on the top of the sleeve 32. A hydraulic cylinder 36 surrounds the sleeve 32, and a piston portion 38 is integrally formed with the sleeve 32 inside the hydraulic cylinder 36 so that the sleeve 32 may be moved longitudinally of the hydraulic cylinder 36 responsive to the delivery of hydraulic fluid to upper and lower conduits 40 and 42 in caps 44 on the hydraulic cylinder 36. The caps 44 are provided with O-rings as illustrated in a conventional manner.

The hydraulic cylinder is supported on the side rails 10 of the milking stall by means of a pair of pivoted yolks 46 and 48 which are pivotally connected at their outer ends to the hydraulic cylinder 36 at pivot axes 50 and 52, respectively. The yolks 46 and 48 are pivotally connected at their inner ends to a support frame 54 at pivot axes 56 and 58, respectively.

The support frame 54 includes a pair of rods 60 and 62 which are attached by brackets 64 to the pipe 10. As can be best seen in FIGS. 1 and 2, each of the brackets 64 is somewhat triangular in shape so that the pivot axes 56 and 58 are not parallel to the pipe 10 but instead are inclined inwardly toward the forward end of the stall so that the arm 20 and sleeve 32 swing toward the rear of the stall as they swing inwardly toward the stall. This arrangement permits the claw support structure to enter the stall from a position substantially forward of the cow's rear legs and still enter the area between the rear legs for efficient support of the claw during milking.

A second hydraulic cylinder 66 is pivotally connected at one end to the upper yolk 46 by means of a pivot pin 68 and is pivotally connected at its other end to the frame 54 by means of a pivot pin 70. The hydraulic cylinder 66 contains an internal piston and piston rod as is conventional in the art so that the cylinder will expand and contract responsive to the delivery of hydraulic fluid to lower and upper conduits 72 and 74, respectively. A threaded rod 76 is pivotally connected to the upper yolk 46 by a pivot pin 78 and extends through an apertured boss 80 on the hydraulic cylinder 66 with an adjusting nut 82 threaded onto the rod 76 to limit the downward swinging of the linkage when the nut 82 engages the boss 80.

As will be apparent from FIGS. 1 and 2, the apparatus may be operated to swing the support arm 20 and claw 14 from a milking position illustrated in solid line to a retracted position illustrated in phantom outline responsive to the delivery of hydraulic fluid to the lower conduit 72 of hydraulic cylinder 66. Conversely, the arm 20 and milking claw 14 may be swung from the withdrawn position to the milking position by delivery of hydraulic fluid to the upper conduit 74 of hydraulic cylinder 66.

The position of the support arm 20 and claw 14 may be adjusted vertically both in the milking and withdrawn positions by delivering hydraulic fluid to one or the other of the conduits 40 and 42 on hydraulic cylinder 46. Thus, when the arm 20 is first swung from the withdrawn position to the milking position, the hydraulic cylinder 36 may then be actuated to adjust the height of the claw 14 to the height of the udder of the cow to be milked.

The operation of the hydraulic cylinders 36 and 66 is controlled by connecting the fluid supply conduits thereof to a conduit 84 which is connected to a source of hydraulic fluid under pressure and a conduit 86 through which hydraulic fluid is exhausted. It is convenient in the installation of this equipment in a milking barn to connect the conduit 84 to the pressurized water supply normally found in such barns and to merely connect the conduit 86 to any waste disposal or drain. The conduits 42, 44, 72 and 74 are connected to the conduits 84 and 86 by means of solenoid valves 88, 90, 92, 94 and 96 which are controlled by electrical solenoids similarly numbered in FIG. 6.

Referring to FIG. 6, control of the solenoid valves 88—96 is provided by means of three relays 98, 100 and 102 which are operated from a source of positive voltage by three switches 104, 106 and 108, respectively. The relays 98—102 are conventional two or three arm relays by which selected two or three of the solenoid valves 88—96 may be operated in response to operation of each of the switches 104—108 as illustrated by the circuit of FIG. 6. It will be apparent from examination of the circuit of FIG. 6 that closing of the switch 104 will simultaneously cause the hydraulic cylinder 66 to contract swinging the arm 20 from the retracted position to the milking position while causing the sleeve 32 to move downwardly in hydraulic cylinder 36 to lower the milking claw 14. The switch 104 may be operated at the start of any milking cycle or later in the cycle to lower the milking claw 14, it being noted that when switch 104 is first closed both of the hydraulic cylinders 36 and 66 will respond, but only the hydraulic cylinder 36 will respond after nut 82 engages stop 80.

It will be noted from examination of FIG. 6 that operation of the switch 106 will cause sleeve 32 to rise in hydraulic cylinder 36 to lift the milking claw 14, and operation of the switch 108 will simultaneously cause hydraulic cylinder 66 to contract and sleeve 32 to rise in cylinder 36 so that the milking claw will be simultaneously moved vertically and withdrawn laterally from the stall. As mentioned above, this switch 108 provides a single control means for simultaneously operating the vertical adjustment and lateral withdrawal so that the apparatus may be used in accordance with the Holm patent by providing any suitable means for closing the switch 108 in response to operation of the measuring means which measures milk flow.

The milking claw 14 mentioned above may be any of the devices which includes a cluster of four teat-engaging members used in the art.

While one embodiment of the invention has been illustrated and described in detail herein, it is obvious that many modifications thereof may be made and will be apparent to those skilled in the art.

I claim:

1. In a milking installation having a cow-milking area with a floor and structural support means above the floor and a milking claw adjacent to said milking area for attachment to the udder of a cow in said milking area, the improved means for supporting said claw which comprises:
    an elongated arm adapted to be connected to said claw at one end thereof and extending upwardly from said claw;
    first adjustable connecting means interconnecting said arm and said structural support means for moving said arm between a milking position with said claw positioned in said milking area under a cow and a withdrawn position with said claw laterally withdrawn from said milking area and positioned vertically above said milking position;
    second adjustable connecting means for moving said claw generally vertically while said arm is in said milking position, and;
    control means for operating said first adjustable connecting means.

2. In a milking installation having a cow-milking area with a floor and structural support means above the floor and a milking claw adjacent to said milking area for attachment to the udder of a cow in said milking area, the improved means for supporting said claw which comprises:
    an elongated arm adapted to be connected to said claw at one end thereof and extending upwardly from said claw;
    first adjustable connecting means interconnecting said arm and said structural support means for moving said arm between a milking position with said claw positioned in said milking area above said floor and a withdrawn position with said claw laterally withdrawn from said milking area, and;
    second adjustable connecting means for moving said claw generally vertically while said arm is in said milking position,
in which said first adjustable connecting means includes a sleeve telescopically surrounding said arm with said arm rotatable in said sleeve about a generally vertical axis when said arm is in said milking position and in which said arm comprises an elongated rigid portion extending through said sleeve and a link portion pivotally connected to said rigid portion at a second pivot axis which is generally parallel to said vertical axis with said link portion pivotally connected to said claw at a third pivot axis which is spaced away from said second axis generally parallel to said vertical axis and said second axis whereby when said arm is in said milking position said claw can move freely with said cow while receiving vertical support from said arm.

3. The apparatus of claim 2 in which said second adjustable connecting means comprises means for raising and lowering said sleeve while said arm is in said milking position.

4. The apparatus of claim 3 characterized further in that said first adjustable connecting means includes pivotal linkage means interconnecting said sleeve and said vertical support means for swinging said sleeve from a vertical position in the milking position of said arm outwardly away from said milking area to move said arm to said withdrawn position.

5. The apparatus of claim 4 characterized further in that said pivotal linkage means of said first adjustable connecting means includes a first hydraulic cylinder, and said means for raising and lowering said sleeve in said second adjustable connecting means includes a second hydraulic cylinder, and said apparatus further includes single control means connected to said first and second hydraulic cylinders for operating said cylinders simultaneously to raise said sleeve and swing said sleeve outwardly from said vertical position.

6. In a milking installation having a cow-milking area with a floor and structural support means above the floor and a milking claw adjacent to said milking area for attachment to the udder of a cow in said milking area, the improved means for supporting said claw which comprises:
    an elongated arm adapted to be connected to said claw at one end thereof and extending upwardly from said claw;
    first adjustable connecting means interconnecting said arm and said structural support means for moving said arm between a milking position with said claw positioned in said milking area above said floor and a withdrawn position with said claw laterally withdrawn from said milking area;
    second adjustable connecting means for moving said claw generally vertically while said arm is in said milking position, and;
    single control means, adapted to be operated automatically, and connected to said first and second adjustable connecting means for simultaneously moving said claw vertically upwardly and moving said arm from said milking position to said withdrawn position.